United States Patent [19]

Choi

[11] Patent Number: 5,615,017
[45] Date of Patent: Mar. 25, 1997

[54] METHOD OF AND CONTROL CIRCUIT FOR COMPRESSION RECORDING AND REPRODUCING OF MULTIPLE IMAGES

[75] Inventor: Hae Y. Choi, Suweon, Rep. of Korea

[73] Assignee: Samsung Electronics Co., Ltd., Kyungki-do, Rep. of Korea

[21] Appl. No.: 978,426

[22] Filed: Nov. 18, 1992

[30] Foreign Application Priority Data

Feb. 21, 1992 [KR] Rep. of Korea .................... 92-2662

[51] Int. Cl.⁶ .................................................. H04N 5/783
[52] U.S. Cl. ........................ 386/109; 345/159; 386/117
[58] Field of Search ................................. 358/335, 108, 358/146, 906; 360/33.1, 35.1, 5, 27, 14.1; 348/153, 159; H04N 5/76, 5/783

[56] References Cited

U.S. PATENT DOCUMENTS

| | | | |
|---|---|---|---|
| 4,001,881 | 1/1977 | Folsom | 360/5 |
| 4,281,354 | 7/1981 | Conte | 360/5 |
| 4,593,318 | 6/1986 | Eng et al. | 358/146 |
| 4,862,292 | 8/1989 | Enari et al. | 358/335 |
| 4,943,854 | 7/1990 | Shiota et al. | 360/33.1 |
| 4,963,995 | 10/1990 | Lang | 358/335 |
| 5,016,107 | 5/1991 | Sasson et al. | 358/906 |
| 5,019,905 | 5/1991 | Pshtissky et al. | 348/159 |
| 5,032,927 | 7/1991 | Watanabe et al. | 358/335 |
| 5,065,259 | 11/1991 | Kubota et al. | 358/335 |
| 5,067,029 | 11/1991 | Takahashi | 358/906 |
| 5,150,212 | 9/1992 | Han | 358/108 |
| 5,187,589 | 2/1993 | Kono et al. | 358/335 |
| 5,193,000 | 3/1993 | Lipton et al. | 358/146 |
| 5,216,552 | 6/1993 | Dunlap et al. | 360/33.1 |
| 5,253,275 | 10/1993 | Yurt et al. | 455/5.1 |
| 5,264,929 | 11/1993 | Yamaguchi | 358/335 |

FOREIGN PATENT DOCUMENTS 3106125 12/1982 Germany ..................... H04N 5/76

Primary Examiner—Thai Q. Tran
Assistant Examiner—Huy Nguyen
Attorney, Agent, or Firm—Sughrue, Mion, Zinn, Macpeak & Seas

[57] ABSTRACT

A control circuit for controlling the compression of image signals for recording and for controlling the expansion of compressed image signals for reproduction includes a recording signal processing circuit which receives a plurality of image signals produced by a plurality of image sources, such as a plurality of video cameras, and a reproducing signal processing circuit, in which a compressed image signal is subjected to an expansion and error correcting process. In the recording signal processing circuit, respective ones of the plurality of image signals are, in turn, subjected to a compression process that reduces the length of the original image signal. The image signal thus compressed is then output to at least one video tape recorder for recording. In the reproducing signal processing circuit, the compressed image signal is expanded to its original length and any errors found therein are corrected. The expanded and corrected image signal thus corresponds the one of the original images taken by a selected one of the image sources. The image signal is suitable for display on a output device such as monitor. A method for compressing sequentially selected video signals prior to recording on a video tape recorder and subsequent expansion and viewing is also described.

18 Claims, 2 Drawing Sheets

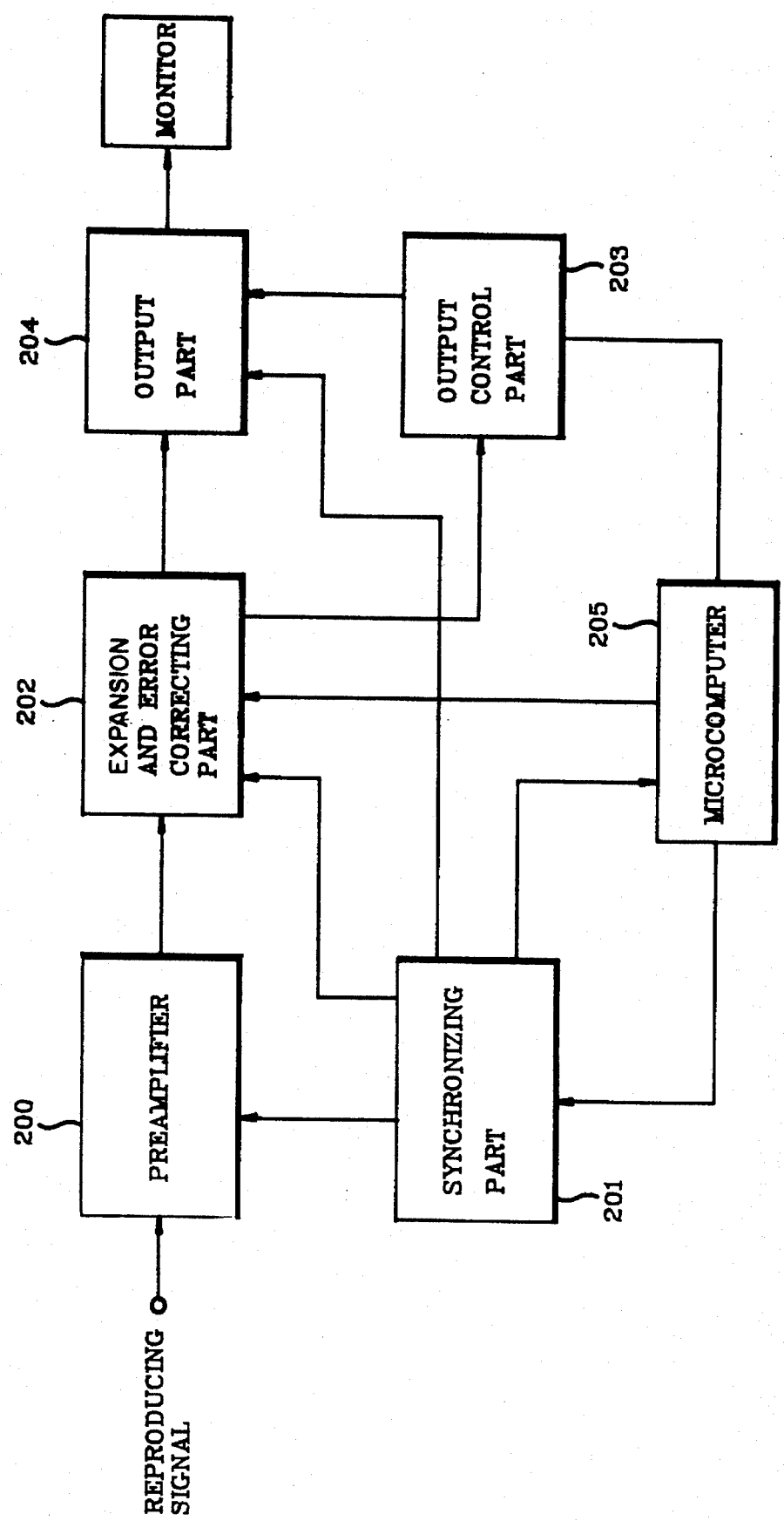

METHOD OF AND CONTROL CIRCUIT FOR COMPRESSION RECORDING AND REPRODUCING OF MULTIPLE IMAGES

BACKGROUND OF THE INVENTION

1. Field of the Invention

The present invention relates to the field of image recording and reproducing using apparatus such as a video camera and video tape recorder. More particularly, the present invention is directed to a method of and control circuit for controlling the compression of image signals for recording and for controlling the expansion of compressed image signals for reproduction. The present invention may be used in systems where a plurality of video cameras are used to produce a plurality of image signals for recording on one or more video tape recorders.

2. Description of the Related Art

In a number of systems, such as surveillance systems and the like, a plurality of video cameras are employed to observe an area for a long period of time. Typically, each of the cameras is used to observe a different portion of the area. When a permanent record of the surveillance is desired, the plurality of video cameras produce image signals that are recorded on a plurality of video tape recorders. As the surveillance is made over a long period of time, a great number of video tapes are required to continuously record the image signals produced by the video cameras. In order to reduce the number of video tapes required for such recording, there has been proposed a time lapse video tape recorder that is capable of recording image signals produced over a long period of time on a single video tape. The time lapse video tape recorder operates by intermittently recording a portion of each image signal produced by each of the plurality of video cameras. This intermittent operation allows the time lapse video tape recorder to record, for example, anywhere between 24 hours and 960 hours of surveillance image signals using a video tape of 120 minutes in length. The time lapse video tape recorder is much like the conventional video tape recorder used for general purposes, such as the well known VHS-type video tape recorder. As a result, the time lapse video tape recorder is limited to recording 30 frames of image data per second, each frame having two fields (i.e., 60 fields per second). Thus, if the video tape length is limited to 120 minutes, the video tape recorder is limited to recording 216,000 frames of image data (i.e., 120 minutes×60 seconds/minute×30 frames/second). Therefore, the recording interval (i.e., the time which lapses between intermittent recording of image signals) for recording 216,000 frames (or 432,000 fields) over a period of, for example, 480 hours is as follows.

$$\text{Recording interval} = \frac{480 \text{ (hr./tape)} \times 60 \text{ (min./hr.)} \times 60 \text{ (sec./min.)}}{216,000 \text{ (frame/tape)} \times 2 \text{ (field/frame)}} = 4 \text{ sec./field}$$

As it can be seen, the time lapse video tape recorder pauses for four seconds after it records each field of data from a given one of the plurality of video tape recorders used in the surveillance system. Having a pause of four seconds between recording causes serious problems in the surveillance system because all of the image information taken by the video camera during the nonrecording period will be lost. As a result, no surveillance during the nonrecording period is possible using the video tape.

In addition, it is very difficult to record the plurality of image signals onto separate video tapes for each of the plurality of video cameras because the apparatus required to perform the operation would be so large that it would be uneconomical to do so. To overcome this problem, there has been proposed a switching device that sequentially selects one of a plurality of channels in multiplexing fashion so that the image signals produced by the plurality of video cameras can be recorded on one or a reduced number of video tape recorders. This switching device is effective to reduce the number of video tapes required to record the surveillance image signals over a long period of time (e.g., 480 hours); however, the switching device requires a long recording interval for each camera, which may result in serious problems for the surveillance system. For example, assuming that the image signals from 8 video cameras are recorded on one video tape recorder during 480 hours of continuous surveillance using the automatic sequential switching device, the recording interval for each camera becomes 32 seconds (i.e., 4 seconds (as calculated above)×8 cameras). Thus, a video camera fixed on a portion of secured area would only record an image every 32 seconds. This recording interval magnifies the problem identified above in that the recording interval is too long to adequately provide surveillance of an area. For example, an intruder appearing within the viewing area of a camera will go undetected as long as he does not appear within the viewing range of any camera for more than a few seconds (as much as 32 seconds) at a time.

SUMMARY OF THE INVENTION

The present invention overcomes the above problems by providing a method of and a control circuit for controlling compression of one of a plurality of image signals for recording by at least one video tape recorder, and controlling the reproduction of a compressed image signal by controlling the expansion and correction of the compressed image signal to reproduce the original image taken by one of the plurality of video cameras.

The control circuit of the present invention is made up of two circuits. The first circuit is a recording signal processing circuit that receives a plurality of image signals produced by a plurality of image sources, such as a plurality of video cameras. In the recording signal processing circuit, respective ones of the plurality of image signals are, in turn, subjected to a compression process that reduces the length of the original image signal. The image signal thus compressed is then output to at least one video tape recorder for recording.

The second circuit making up the inventive control circuit is a reproducing signal processing circuit. In the reproducing signal processing circuit, a compressed image signal is subjected to an expansion and error correcting process, wherein the compressed image signal is expanded to its original length and any errors found therein are corrected. The image signal thus expanded and corrected represents the original image taken by one of the plurality of image sources. The image signal thus expanded can then be used by a monitor or the like for display.

The objects and features of the present invention will become more apparent from the detailed description below, with reference to the appended drawings.

BRIEF DESCRIPTION OF THE DRAWINGS

FIG. 2 is a block diagram of a reproducing signal processing circuit according to the present invention.

DETAILED DESCRIPTION OF THE PREFERRED EMBODIMENT

Figure 1:
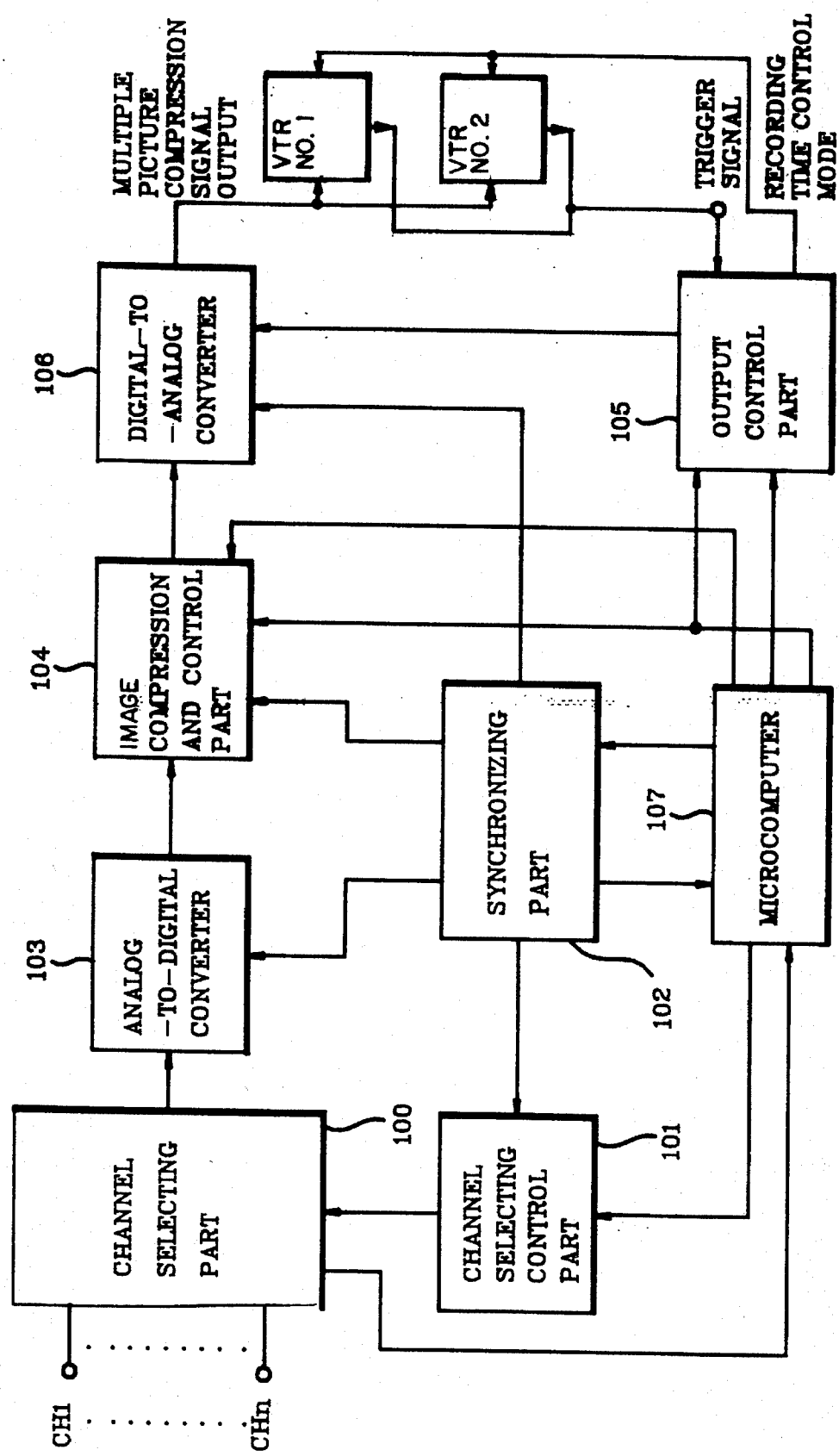
FIG. 1 is a block diagram of a recording signal processing circuit according to the present invention.

A preferred embodiment of the inventive method and the control circuit used to perform the method in accordance with the present invention will be described in detail below.

A first portion of the control circuit is made up of a recording signal processing circuit as shown in FIG. 1. The recording signal processing circuit has a channel selecting part 100 for selecting one of a plurality of channels (CH1–CHn) and outputting a signal from the selected channel under control of channel selecting control part 101. A synchronizing part 102 is connected to the channel selecting control part 101 for synchronizing the control signals output to the channel selecting part 100. An analog-to-digital (A/D) converter 103 receives the channel signal output from the channel selecting part 100 and converts the signal into a digital signal. An image compression and control part 104 receives the digital signal from the A/D converter 103 and compresses the signal prior to output to a digital-to-analog (D/A) converter 106. The D/A converter 106 converts the compressed digital signal into an analog signal and outputs the signal under control of output control part 105. The output control part 105 receives signals from a microcomputer 107 and an external device. The external device may be a time lapse video tape recorder that intermittently issues a trigger signal when the recorder is ready to record an image signal. In response to a control signal from microcomputer 107 or from the external device, the output control part 105 outputs a control signal to D/A converter 106 to cause the converter to output the compressed image signal for recording by the video tape recorder or the like.

In operation, the recording signal processing circuit of FIG. 1 is connected to a plurality of image sources, such as a plurality of video cameras, via channel input terminals CH1 through CHn connected to channel selecting part 100. When one or more of the plurality of video cameras produces an image signal, the image signal is received over the respective input terminals by the channel selecting part 100. Microcomputer 107 detects the existence of image signals on respective channel input terminals of the selecting part 100, and subsequently provides control signals to the channel selecting control part 101 concerning the order in which each channel should be selected for output. Thus, for example, when the microcomputer 107 detects the existence of image signals on channels CH1, 2, 3 and 6 (wherein the total number of channels is 8), the microcomputer 107 may issue control signals requiring the order of selection to be one of ascending order (i.e., CH1→2→3→6→1→2 . . . ). The predetermined order, of course, is arbitrary and is to be selected by the practicing artisan and programmed in the microcomputer 107.

The microcomputer 107 is controlled by a program or the like to perform the operations described herein. The manner in which the microcomputer 107 should be programmed is well known in the art and therefore is not described in detailed.

When the channel selecting part 100 selects the appropriate channel, as controlled by channel selecting control part 101, the channel selecting part 100 outputs an image signal to A/D converter 103. Under synchronous control of synchronizing part 102, A/D converter 103 converts the analog image signal into a digital signal for output to image compression and control part 104. Control part 104 performs a compression process on the digital image signal. It should be noted that the specific compression technique utilized is not critical to the invention. Any one of the compression techniques known to one of ordinary skill in the art can be utilized by the image compression and control part 104. For example, a run-length (RL) coding compression, interpolation compression, predictive compression, or discrete cosine transformation (DCT) technique are some of the techniques well known in the art which may be utilized in the present invention. As indicated, such techniques are well known in the art and therefore will not be described in detail.

The optimum compression ratio (n:1) to be used by the control part 104 is determined in accordance with such factors as the number of active video cameras, the number of video tape recorders, the type of image taken by the video cameras (e.g., still picture, moving picture), and other factors that are well known in the art. For example, in the case where the image requires high resolution because of its detailed nature, the compression ratio is low. On the other hand, where the image is a still picture or a simple moving picture, the ratio is high. The ratio (n:1) represents the number of image fields that are to be recorded as one image field of data. The higher the compression ratio, the lower the resolution of the image.

In the case where the image signals of a plurality of cameras is to be compressed, the determination of an optimum ratio is somewhat more difficult because each camera may have a different "optimum" ratio depending on its respective viewing area. Thus, the control part 104 must additionally determine the compression ratio of the camera having the lowest compression ratio among the plurality of cameras. This ratio is used as the optimum ratio (n:1) for each of the plurality of cameras.

In accordance with the present invention, if the image signals from eight image sources are compressed using a ratio of 4:1, only two video tape recorders are required for recording the image signals. If the signals are to be recorded over a long period of time (e.g., 480 hours), the resulting recording interval is only 8 seconds/field (i.e., 4 seconds/field/recorder×2 recorders). As it can be seen, the resulting recording interval is much shorter than the 32 seconds required in the conventional system described above. By further increasing the compression ratio to 8:1 or 16:1, the recording interval is reduced to 4 seconds/field and 2 seconds/field, respectively. The increase of the compression ratio, however, increases the noise due to the lower resolution of the recorded image signals.

The optimum ratio thus determined is then output to microcomputer 107 and output control part 105. The image compression and control part 104 then outputs the compressed image signal to D/A converter 106 in response to a synchronizing signal output by synchronizing part 102.

The D/A converter 106 converts the digital compressed signals to analog signals and outputs the signals under control of synchronizing part 102 and output control part 105. As mentioned above, the output control part 105 outputs a control signal in response to a control signal from microcomputer 107 or a trigger signal from an external device, such as a time lapse video tape recorder. The output control part 105 also issues a recording time control mode signal indicative of the time mode of operation (e.g., slow play SP=240 hrs., long play LP=480 hrs., etc.) to be used by the external device. The output control part 105 receives a signal from microcomputer 107 indicative of the optimum recording time mode to be utilized. This time mode is determined by the microcomputer 107 in accordance with factors such as the number of sequentially switched cameras, image compression, and the compression ratio received from the image compression and control part 104, as shown in the following Table.

TABLE

| Recording Mode | 24 | 48 | 72 | 120 | 240 | 480 |
|---|---|---|---|---|---|---|
| Recording Time (hours) | 24 | 48 | 72 | 120 | 240 | 480 |
| Recording Interval (seconds) | 0.2 | 0.4 | 0.6 | 1 | 2 | 4 |
| Camera Switching Interval (seconds) | 1.6 | 3.2 | 4.8 | 8 | 16 | 32 |

It should be noted that the recording time mode can also be selected by the user. However, where the user does not know the optimum recording time mode, it is preferable that the mode be selected automatically, as described above.

The microcomputer 107 and the synchronizing part 102 control the flow of image signal data from the channel selecting part 100 through the D/A converter 106. The appropriate time for selecting one of the plurality of image signals appearing on channels CH1 through CHn, and the repetition selecting interval is determined by the microcomputer 107 and the synchronizing part 102 in accordance with a variety of factors, such as the number of video tape recorders recording the compressed image signals, the length of the video tape used by the video tape recorder, the compression ratio deemed appropriate by the image compression and control part 104, etc.

For example, first, assume that a plurality of image sources, such as video cameras A–F, are connected to channel input terminal CH1 through CH8 in the following manner: CH1 channel, A camera; CH2 channel, none; CH3 channel, B camera; CH4 channel, C camera; CH5 channel, D camera; CH6 channel, E camera; CH7 channel, none; and CH8 channel, F camera. Second, assume that a recording time mode is selected as 480 hours and that the recording interval between recording fields is 4 seconds, as in the above Table. Then, the image compression and control part 104 may determine that the optimum compression ratio is 6:1, thereby resulting in the sampling of one field of video from each of cameras A–F to be compressed together and recorded as one field of image signal data on a video tape by a video tape recorder. If, however, the optimum compression ratio is determined to be 12:1, the microcomputer 107 and the synchronizing part 102 control the components of the recording signal processing circuit such that the sequence of video cameras A–F can be selected twice for a single field of recorded data. Accordingly, because the image signals from each camera are recorded two times during the 4-second recording interval, the interval between recording for each video camera will be 2 seconds/field. Thus, using the inventive control circuit, the recording interval can be greatly reduced to overcome the problems in the prior art.

The control circuit of the present invention is further composed of a reproducing signal processing circuit like that shown in FIG. 2. A reproducing signal, such as a compressed image signal recorded on a video tape and reproduced by a video tape recorder, appears at the input terminal of preamplifier 200. The preamplifier amplifies the image signal and outputs the signal to expansion and error correcting part 202 under control of synchronizing part 201. The expansion and error correcting part 202 operates to expand the reproducing signal from its compressed state to an expanded state representative of the original image signal produced by a respective one of the plurality of video cameras connected to the inventive control circuit. The expansion and error correcting part 202 performs the inverse process of the compression process performed by the image compression and control part 104 (FIG. 1). After expanding the compressed image signal, the part 202 checks the signal for errors, using techniques well known in the art, and corrects any errors found therein. Under control of microcomputer 205 and synchronizing part 201, the expansion and error correcting part 202 then outputs an expanded and corrected image signal to output part 204. Under control of output control part 203 and synchronizing part 201, the output part 204 outputs the expanded and corrected image signal to an external device, such as a monitor, as a reproduced image signal representative of the original image produced by one of the plurality of video cameras.

It should be noted that the channel signals output at the time of recording by the recording processing circuit (FIG. 1) contain at least a start signal, a stop signal, and an identification number signal for identifying the channel (e.g., CH1) from which the compressed image signal is derived. The output control part 203 receives such control signals from part 202 in order to discriminate between the different image signals originally produced by the different image sources. In another aspect of the present invention, the output control part 203 may control output part 204 to only output expanded and corrected signals derived from a given channel (e.g., CH1) as identified by the identification number signal contained in the image signal output by part 202. In this manner, an operator viewing the image signals need not observe all of the signals output by the plurality of image sources.

As can be seen from the above description, the present invention overcomes the problems of the prior art by sequentially selecting individual image signals output from a plurality of image sources and compressing the image signals prior to recording by an image recorder. The compressed images recorded can easily be reproduced by expanding and correcting the stored image signals in accordance with the present invention so that a reproduction of each of the original image signals can be viewed on a monitor or the like in an efficient and effective manner.

The present invention should not be limited by the foregoing detailed description. Various modifications of the present invention will become apparent to persons skilled in the art upon reference to the above description. The appended claims should be construed to cover any and all of such modifications that fall within the true scope of the present invention.

What is claimed is:

1. A control circuit for controlling the recording of image signals, which are output by a plurality of image sources, using at least one image recorder, the control circuit comprising:

a channel selecting device having a plurality of channel input terminals each connected to a respective one of said plurality of image sources, said channel selecting device producing an output signal corresponding to an image signal output from one of said image sources as the image signal appears on a respective one of said channel input terminals;

an image compression device that receives the output signal from said channel selecting device and compresses image corresponding to said output signal; and a control device that outputs a select signal to said channel selecting device for producing said output signal, said control device further outputting a control signal to activate said image compression device to compress the output signal received from said channel selecting device and to generate a compressed image signal for recording by said at least one image recorder, wherein said control device automatically outputs a different select signal to identify each one of said plurality of channel input terminals in a repeating sequence at predetermined intervals, and wherein said compression device compresses said output signal by a compression ratio sufficient for recording a predetermined number of image signals taken from said image sources on a video tape bandwidth that corresponds to recording of one image from one of said image sources in an uncompressed state in response to the number of the image sources and the recording speed of the video tape of said at least one image recorder.

2. The control circuit of claim 1, wherein said control circuit receives image signals from image sources that are video cameras, and wherein said image compression device performs a discrete cosine transformation image compression operation to reduce the bandwidth of said output signal.

3. The control circuit of claim 1, wherein said image compression device generates a plurality of compressed image signal portions for alternate recording by two image recorders.

4. The control circuit of claim 1, wherein said at least one image recorder is a time lapse video tape recorder that generates a video tape record signal when the tape recorder is ready to record said compressed image signal, said control device outputting said control signal in response to receiving said video tape record signal.

5. The control circuit of claim 1, further comprising:

an analog-to-digital converter for converting the output signal from said channel selecting device from an analog output signal into a digital signal for input by said image compression device; and a digital-to-analog converter for converting a digital compressed image signal generated by said image compression device into an analog form for recording by said at least one image recorder.

6. The control circuit of claim 1, further comprising:

an image expansion device that receives a reproduced compressed image signal from said at least one image recorder and expands the reproduced compressed image signal to provide a reproduced image signal; and a second control device that outputs a respective control signal to activate said image expansion device so that the reproduced compressed image signal is expanded to an uncompressed state representative of the original image signal output by one of said plurality of image sources.

7. The control circuit of claim 6, wherein said reproduced compressed image signal comprises control codes representing a compression ratio of the reproduced compressed image signal and channel identification data which identifies the channel to which the reproduced compressed image signal corresponds.

8. The control circuit of claim 7, wherein said control device reads said control codes and allows only the image signals produced by a given one of said plurality of channel input terminals to be output to an external monitor using said control codes.

9. A control circuit for controlling the recording and reproduction of original image signals output by a plurality of image sources using at least one image recorder, the control circuit comprising:

channel selecting means for selecting one of a plurality of channel input terminals, each of said terminals respectively connected to one of said plurality of image sources, said channel selecting means producing an output signal corresponding to the image signal output from one of said image sources;

image compression means for compressing the output signal from said channel selecting means so as to produce a compressed image signal and thereby reduce the bandwidth of the output signal, said compressed image signal being recordable on said image recorder;

control means for determining an order of the plurality of channel input terminals with which said channel selecting means is to select the output signal, said control means outputting a control signal to activate said image compression means to compress the output signal received from said channel selecting means and to generate a compressed image signal for recording by said at least one image recorder, wherein said control means intermittently determines a different one of said plurality of channel input terminals for selection in sequence; and image expansion means receiving said compressed image signal from said image recorder for expanding the compressed image signal, wherein said control means outputs a control signal to activate said image expansion means so that the compressed image signal is expanded to an uncompressed state representative of the image signal output by one of said plurality of image sources;

wherein said signal output from said channel selecting means is compressed by a compression ratio sufficient for recording of images from all of said plurality of image sources on a recording medium bandwidth that corresponds to recording of one image from one image source in an uncompressed state in response to the number of the image sources and the recording speed of the recording medium of said at least one image recorder.

10. A method of controlling the recording and reproduction of original image signals output by a plurality of image sources using at least one image recorder, the method comprising the steps of:

intermittently selecting each of said plurality of image sources in sequence and producing an output signal corresponding to each of the image signals output from respective said image sources thus selected;

compressing the output signal produced in said selecting step so as to reduce the bandwidth of the output signal, wherein said output signal is compressed by a ratio sufficient for recording respective ones of each of the image signals from all of said plurality of image sources on a recording medium bandwidth that corresponds to recording of one image from one image source in an uncompressed state; and generating a compressed image signal for recording by said at least one image recorder in response to the number of the image sources and the recording speed of the recording medium of said at least one image recorder.

11. The method of controlling as recited in claim 10, said method further comprising the step of expanding the compressed image signal so that the compressed image signal is expanded to an uncompressed state representative of said output signal.

12. A control circuit for a security system having N image sources, where N is an integer and N is greater than 1, and at least one image recorder, said control circuit comprising:

a selector for selecting a predetermined first number of N input terminals in a predetermined order during a first period of time defined by a first receipt of a control signal and a second receipt of said control signal so as to generate M video signal portions, each of said N input terminals connected to a respective one of said N image sources, and each selection of one of said N input terminals producing one of said M video signal portions corresponding to a respective video signal portion produced by a respective one of said N image sources; and a compressor for compressing said M video signal portions into a compressed video portion so as to permit said image recorder to record said compressed video portion during a second period of time substantially equal to a recording time required to record any one of said M video signal portions in response to the number N of said image sources and a recording speed of the recording medium of said at least one image recorder on which said compressed video portion is recorded.

13. The control circuit for a security system as recited in claim 12, wherein each of said M video signal portions is a video field signal.

14. The control circuit for a security system as recited in claim 12, further comprising a controller for generating said control signal.

15. The control circuit for a security system as recited in claim 12, further comprising:

a first convertor receiving each of said M video signal portions as a respective analog signal for generating respective M digital video signal portions; and a second convertor receiving a compressed digital signal portion to thereby generate an analog compressed video portion;

wherein said compressor compresses said M digital video signal portions into said compressed digital video portion and wherein said image recorder records said analog compressed video portion during said second period of time substantially equal to said recording time required to record any one of said M video signal portions.

16. The control circuit for a security system as recited in claim 12, wherein M is less than N, wherein said at least one image recorder comprises I video tape recorders, where I is an integer and I is greater than 1, wherein said compressor generates a plurality of compressed video portions, and wherein each of said I video tape recorders records a corresponding Ith one of said compressed video signal portions.

17. The control circuit for a security system as recited in claim 12, wherein each of said M video signal portions has an associated start signal, an associated stop signal and an associated channel number corresponding to a selected one of said N image sources.

18. The control circuit for a security system as recited in claim 12, further comprising:

an image expander for expanding said compressed image signal portion to produce a plurality of reproduced image signal portions, each of said reproduced image signal portions having an associated channel number corresponding to one of said N image sources; and a controller for controlling an output circuit so as permit a selected one of said reproduced image signal portions to be displayed as an reproduced image signal.

* * * * *